US 12,043,395 B2

United States Patent
Swann et al.

(10) Patent No.: US 12,043,395 B2
(45) Date of Patent: Jul. 23, 2024

(54) AIRCRAFT HYBRID PROPULSION SYSTEM

(71) Applicant: ROLLS-ROYCE PLC, London (GB)

(72) Inventors: Peter Swann, Derby (GB); Kevin M Britchford, Derby (GB)

(73) Assignee: ROLLS-ROYCE plc, London (GB)

(*) Notice: Subject to any disclaimer, the term of this patent is extended or adjusted under 35 U.S.C. 154(b) by 95 days.

(21) Appl. No.: 17/941,374

(22) Filed: Sep. 9, 2022

(65) Prior Publication Data

US 2023/0101578 A1   Mar. 30, 2023

(30) Foreign Application Priority Data

Sep. 27, 2021   (GB) ...................................... 2113728

(51) Int. Cl.
| | | |
|---|---|---|
| *B64D 31/00* | (2024.01) | |
| *B64D 27/10* | (2006.01) | |
| *B64D 27/24* | (2006.01) | |
| *F02C 6/00* | (2006.01) | |
| *B64D 27/02* | (2006.01) | |

(52) U.S. Cl.
CPC ............. *B64D 27/10* (2013.01); *B64D 27/24* (2013.01); *B64D 31/00* (2013.01); *F02C 6/00* (2013.01); *B64D 27/026* (2024.01)

(58) Field of Classification Search
CPC ...... B64D 27/10; B64D 27/24; B64D 27/026; B64D 31/00; F02C 6/00
See application file for complete search history.

(56) References Cited

U.S. PATENT DOCUMENTS

| | | | | |
|---|---|---|---|---|
| 6,880,784 | B1* | 4/2005 | Wilkinson | G05D 1/0661 244/76 R |
| 2010/0083632 | A1* | 4/2010 | Foster | B64D 27/24 60/39.181 |
| 2010/0126178 | A1* | 5/2010 | Hyde | F02K 3/025 60/645 |
| 2018/0230844 | A1* | 8/2018 | Vondrell | H02K 7/1823 |
| 2020/0153252 | A1* | 5/2020 | Long | B64D 27/02 |
| 2023/0150681 | A1* | 5/2023 | Ramakrishnan | B64D 31/06 60/773 |

FOREIGN PATENT DOCUMENTS

| | | |
|---|---|---|
| EP | 3 360 783 A1 | 8/2018 |
| EP | 3 650 351 A1 | 5/2020 |

OTHER PUBLICATIONS

Jan. 10, 2024 Notice of Allowance issued in U.S. Appl. No. 17/941,358.

(Continued)

*Primary Examiner* — Tye William Abell
(74) *Attorney, Agent, or Firm* — Oliff PLC

(57) ABSTRACT

An aircraft hybrid propulsion system (5) comprising an inboard gas turbine engine (10*a*, 10*c*) and an outboard gas turbine engine (10*b*, 10*d*), each comprising a propulsor (12*a*, 12*b*) and a respective electric machine (32*a*, 32*b*) coupled to one or more engine shaft (24*a*, 24*b*). An electrical interconnection (34) is provided between the electric machine (32*a*) of the inboard gas turbine engine (10*a*) and the electric machine (32*b*) of the outboard gas turbine engine (10*b*). A controller (36) is configured to transfer electrical power between the inboard gas turbine engine electrical machine and the outboard gas turbine engine electrical machine when a thrust setting change is selected.

9 Claims, 7 Drawing Sheets

(56) References Cited

OTHER PUBLICATIONS

Nov. 1, 2023 Office Action issued in U.S. Appl. No. 17/941,358.
Jun. 2, 2023 Office Action issued in U.S. Appl. No. 17/941,358.
Jun. 1, 2022 Search Report issued in British Patent Application No. 2113728.6.
Jun. 16, 2022 Search Report issued in British Patent Application No. 2113729.4.
U.S. Appl. No. 17/941,358, filed Sep. 9, 2022 in the name of Peter Swann et al.
Sep. 22, 2022 Extended Search Report issued in European Patent Application No. 22192721.3.
Oct. 20, 2022 Extended Search Report issued in European Patent Application No. 22192722.1.
Aug. 31, 2023 Office Action issued in U.S. Appl. No. 17/941,358.

* cited by examiner

AIRCRAFT HYBRID PROPULSION SYSTEM

The present disclosure concerns a parallel hybrid propulsion system for an aircraft, an aircraft comprising the propulsion system, and a method of controlling an aircraft propulsion system.

Parallel hybrid aircraft have been proposed, in which an internal combustion engine is combined with one or more electric motors to drive one or more propulsors. Parallel hybrid systems can be distinguished from so-called "serial hybrid" systems, in that in a parallel hybrid system, a mechanical connection is provided by the internal combustion engine and at least one propulsor, with at least one electric motor driving either the same propulsor as that driven by the internal combustion engine, or a further propulsor.

According to a first aspect there is provided an aircraft hybrid propulsion system comprising;

an inboard gas turbine engine and an outboard gas turbine engine, each gas turbine engine comprising a propulsor and an electric machine coupled to one or more engine shaft;

an electrical interconnection between the electric machine of the inboard gas turbine engine and the electric machine of the outboard gas turbine engine; and a controller configured to transfer electrical power between the inboard gas turbine engine electrical machine and the outboard gas turbine engine electrical machine when a thrust setting change is selected.

The inventors have found that, by transferring power between the inboard engine and the outboard engine where an engine thrust change is commanded, cabin noise can be reduced in flight, while providing a desired thrust level.

The aircraft propulsion system may comprise a port inboard gas turbine engine and a starboard inboard gas turbine engine, and may comprise a port outboard gas turbine engine and a starboard outboard gas turbine engine.

Alternatively, the inboard gas turbine engine may be mounted substantially at a centreline of the aircraft, and the outboard gas turbine engines may comprise a pair of engines mounted on port and starboard sides respectively of the aircraft.

At least one of the electric machines may be operable as an electric motor, which may be coupled to the propulsor. One or more gas turbine engine may comprise a high-pressure spool and a low-pressure spool, wherein the propulsor forms part of the low-pressure spool.

In a first embodiment, the controller may be configured to transfer electrical power from the electric machine of the inboard gas turbine engine acting as a generator to the electric machine of the outboard gas turbine engine acting as a motor. Advantageously, increased thrust can be provided by the engines, while maintaining a relatively low shaft speed of the inboard engine, thereby reducing noise generated by that engine. In view of the increased distance between the outboard engine and the fuselage relative to the inboard engine, noise perceived by passengers within the fuselage is reduced relative to conventional propulsion systems.

The controller may be configured to transfer electric power from the electric machine of the inboard gas turbine engine to the electric machine of the outboard gas turbine engine when one or more of the following conditions are met:

the aircraft is at an altitude greater than a predetermined minimum;
the current engine thrust is between a predetermined minimum and a predetermined maximum; and
an increased or reduced thrust setting is selected.

The controller may be configured to maintain a current overall propulsion system thrust for a predetermined period of time in advance of the changed thrust setting being selected. Advantageously, engines can be throttled relatively slowly in advance of a thrust increase or decrease, thereby reducing the rate of engine noise level change, and thereby reducing a perception of increased noise.

In a second embodiment of the invention, the controller may be configured to transfer electrical power from the electric machine of the outboard gas turbine engine acting as a generator to the electric machine of the inboard gas turbine engine acting as a motor. Advantageously, engine thrust can be increased gradually on the inboard engine, while reducing thrust on the outboard engine, thereby maintaining thrust at a constant value. The controller may be configured to reduce electric power transfer from the outboard electric machine to the inboard electric machine where an increased thrust is selected.

According to a second aspect of the disclosure there is provided an aircraft comprising the hybrid propulsion system of the first aspect.

According to a third aspect of the disclosure there is provided a method of operating an aircraft hybrid propulsion system, the aircraft propulsion system comprising:

an inboard gas turbine engine and an outboard gas turbine engine, each comprising a propulsor and a respective electric machine coupled to one or more engine shaft; and an electrical interconnection between the electric machine of the inboard gas turbine engine and the electric machine of the outboard gas turbine engine;

wherein the method comprises:

transferring electrical power between the inboard gas turbine engine electrical machine and the outboard gas turbine engine electrical machine when a thrust setting change is selected.

According to a fourth aspect of the disclosure there is provided a controller configured to carry out the method of the third aspect of the disclosure.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
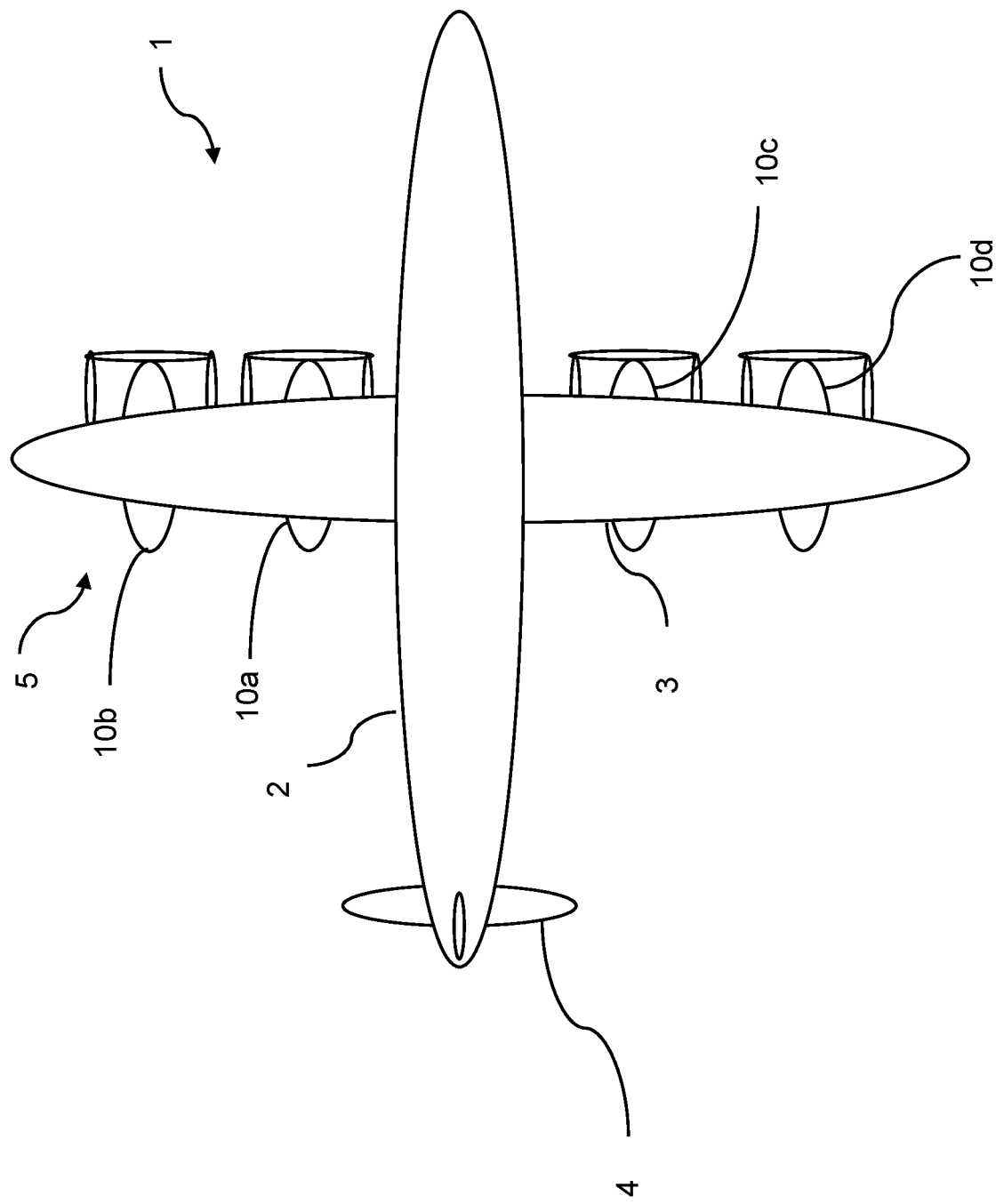
FIG. 1 is a plan view of a first aircraft comprising a parallel hybrid propulsion system.

With reference to FIG. 1, an aircraft 1 is shown. The aircraft comprises a fuselage 2, wings 3, tail 4 and a propulsion system 5. The propulsion system comprises a plurality of propulsive gas turbine engines mounted to the wings 3 in pairs, with a first pair comprising an inboard gas turbine engine 10a and outboard gas turbine engine 10b provided on a port wing, and a second pair comprising an inboard gas turbine engine 10c and outboard gas turbine engine 10d provided on a starboard wing. Part of the propulsion system 5 is shown in detail in FIG. 2.

Figure 2:
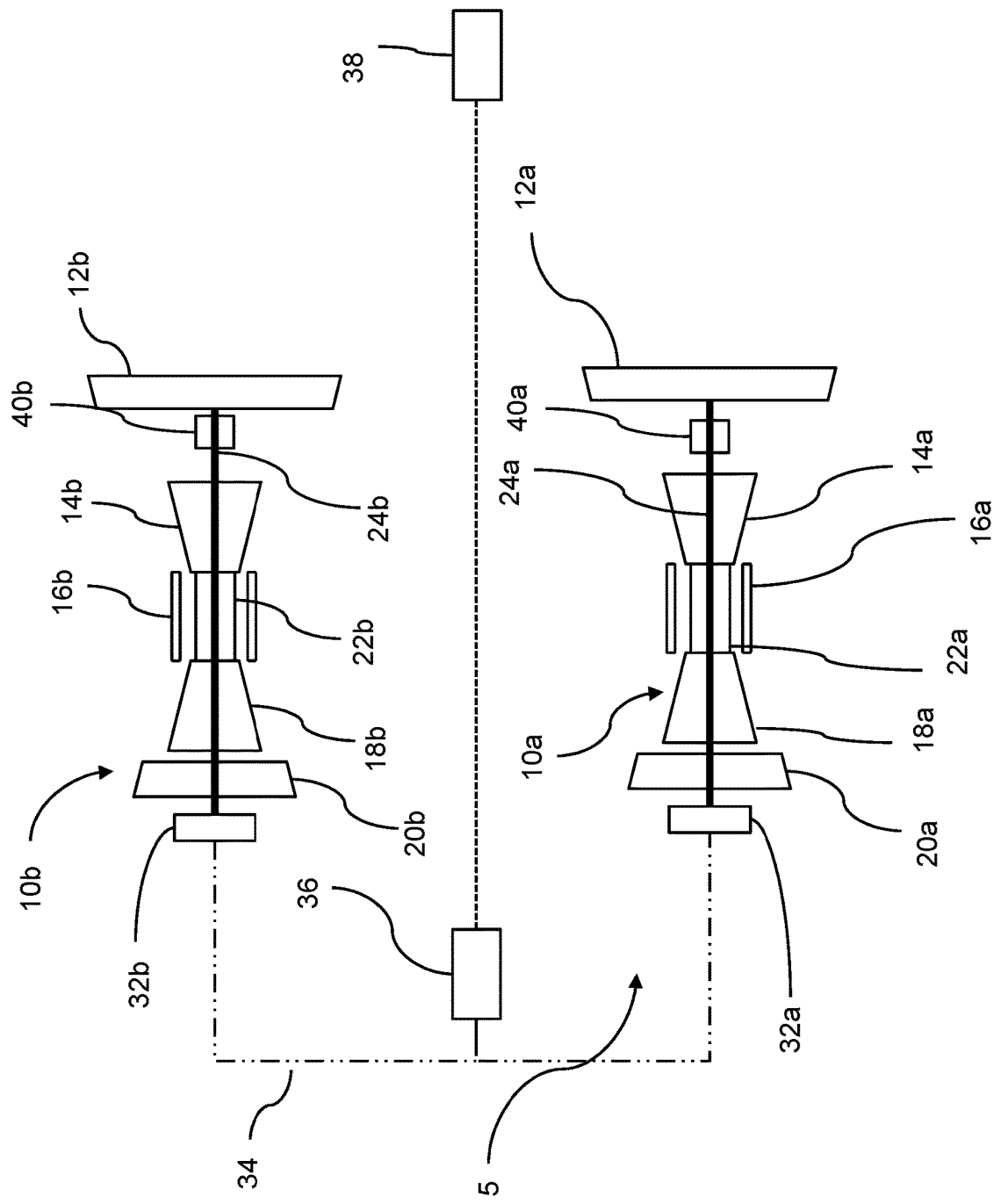
FIG. 2 is a schematic diagram of part of a parallel hybrid propulsion system for the aircraft of FIG. 1.

FIG. 2 shows the first gas turbine engine pair 10a, 10b schematically. Each gas turbine engine 10a, 10b-comprises, in axial flow series, a propulsor in the form of a ducted fan 12a, 12b, a compressor 14a, 14b, combustion equipment 16a, 16b and high and low-pressure turbines 18a, 18b, 20a, 20b. The second pair of engines 10c, 10d are similar to the first pair.

The gas turbine engine 10 works in the conventional manner so that air is accelerated by the respective fan 12a, 12b to produce two air flows: a first core air flow into the compressor 14a, 14b and a second air flow which bypasses the compressor 14a, 14b to provide propulsive thrust. The core air flows through the compressor 14a, 14b where it is compressed, before delivering that air to the combustion equipment 16a, 16b, where it is mixed with fuel and the mixture combusted. The resultant hot combustion products then expand through, and thereby drive, the turbines 18a, 18b, 20a, 20b before being exhausted through a nozzle to provide additional propulsive thrust. The high 18a, 18b and low-pressure turbines 20a, 20b, 20a, 20b drive respectively the compressor 14a, 14b and fan 12a, 12b, each by suitable high and low pressure interconnecting shaft 22a, 22b, 24a, 24b. Together, the low pressure turbine 20a, 20b, fan 12a, 12b and shaft 24a, 24b make up a low pressure spool, and the high pressure turbine 18a, 18b, compressor 14a, 14b and shaft 22a, 22b make up a high pressure spool.

Other gas turbine engines to which the present disclosure may be applied may have alternative configurations. By way of example such engines may have an alternative number of interconnecting shafts (e.g. three) and/or an alternative number of compressors and/or turbines. For example, a booster compressor may be coupled to the low pressure shaft 24a, 24b. Further, the engine may comprise a gearbox provided in the drive train from a turbine to a compressor and/or fan. The ducted fan may be replaced by a propeller or unducted fan.

The propulsion system 5 further comprises a plurality of electrical machines 32a, 32b. In particular, the inboard gas turbine engine 10a comprises an electrical machine 32a capable of operating at least as an electric generator, and the outboard gas turbine engine 10b comprises an electrical machine 32b capable of operating at least as an electric motor. Each electric machine 32a, 32b is of a conventional type, such as an induction or permanent magnet electric machine, and is coupled to a respective low-pressure shaft 24a, 24b. Each machine 32a, 32b comprises a stator comprising electrical windings (not shown), which can be energised to produce a rotating magnetic field (when used as a motor) and interact with a rotating magnetic field generated by a rotor to be energised to produce electric current (when operated as a generator). Consequently, the fan 12b may be powered by either or both of the gas turbine engine 10b via the low-pressure turbine 20b, and the motor 32b, while the turbine 20a of the gas turbine 10a drives the electric machine 32a to operate it as a generator.

An electrical interconnector 34 is provided, which electrically couples the electric machines 32a, 32b to one another, to allow for power transfer at least from the inboard gas turbine engine 10a low pressure shaft 24a via the electric generator 32a, to the outboard gas turbine engine 10b low pressure shaft 24b via the electric motor 32b. Optionally, each of the electric machines 32a, 32b may comprise motor/generators, capable of being operated as either motors or generators, such that power can be transferred between engines 10a, 10b in either direction.

Transfer of power between engines 10a, 10b is controlled by a controller 36. The controller 36 may comprise power electronics configured to accept AC electrical power generated by one of the electric machines at a first frequency, and convert this to AC power at a second frequency, to control both electric motor power, and rotational speed. Alternatively, separate inverters and rectifiers may be provided. As a still further alternative, each of the machines 32a, 32b may comprise a DC machine, and the controller 36 may comprise a DC controller.

The controller 36 is configured to modulate transfer of power in accordance with a signal received from an aircraft thrust controller 38. The aircraft thrust controller is operable to control a thrust generated from the engines 10a, 10b, and may comprise an aircraft throttle lever, autopilot, or autothrottle.

Figure 3:
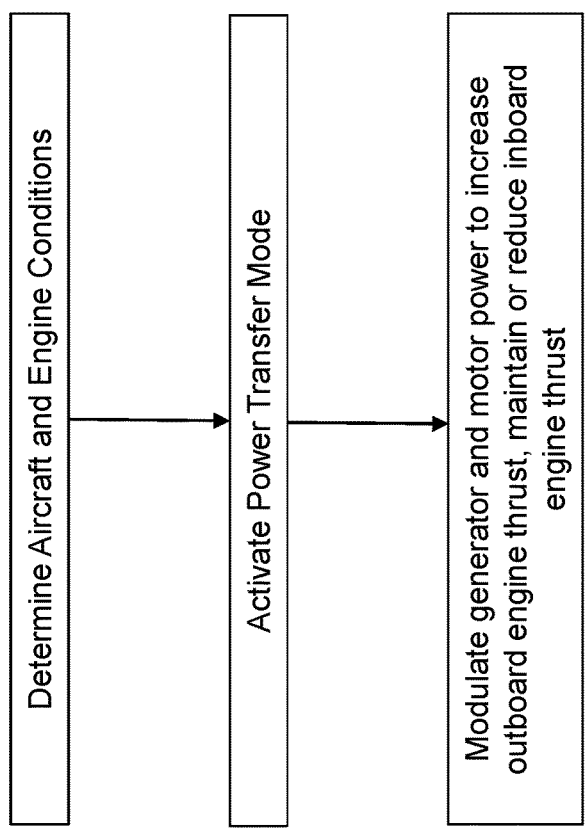
FIG. 3 is a flow diagram of a first method of operating the propulsion system of FIG. 1.

The controller 36 is operable to control the electric machines 32a, 32b to modulate power transfer between the engines 10a, 10b in accordance with a first operational method, as shown diagrammatically in FIG. 3.

In a first step, aircraft and engine conditions are monitored. The aircraft conditions may comprise one or more of aircraft speed and altitude, and the engine conditions may comprise engine rotational speed or thrust setting. For example, the controller 36 may only provide power transfer where the aircraft is determined to be in a cruise mode, i.e. is flying greater than a predetermined minimum altitude, and at greater than a predetermined speed, and between a maximum and minimum throttle setting.

If the aircraft and engine conditions are met, the controller 36 enables a power transfer mode. In the power transfer mode, power transfer is adjusted where a thrust change demand is received from the thrust controller 38. Alternatively, power transfer mode may be selected by the pilot.

Where a thrust increase is demanded from the thrust controller 38, for example, from a cruise thrust setting to a climb thrust setting, power transfer is modulated. In this example, the electric machines 32a, 32b are controlled such that the electric machine 32a is operated as a generator, and the electric machine 32b is operated as an electric motor, such that increased power is transferred from the inboard gas turbine engine 10a low pressure shaft 24a to the outboard gas turbine 10b low pressure shaft 24b. Simultaneously, both the engines 10a, 10b are controlled (by either the controllers 36 or 38) to increase power. Typically, this translates to an increased fuel flow demand. In response to the increased fuel flow, power of each engine 10a, 10b is increased.

The response from each of the engines 10a, 10b to this increased fuel flow however differs, in view of the power transfer. In the case of the inboard engine, as fuel flow increases, turbine power increases, and the high-pressure spool (comprising compressor 14a, turbine 18a and shaft 22a) increases in speed. However, in view of the increased load on the low-pressure shaft 24a in view of the activation of the electric generator 32a, the low-pressure shaft 24a does not accelerate, accelerates to a relatively small degree, or may even decelerate. In some cases, the controller 36 may be configured such that the low-pressure shaft 24 speed stays substantially constant with increasing thrust demand over a predetermined range of rotational speeds.

For instance, the gas turbine engine 10a may comprise a low-pressure shaft speed sensor 40. The low-pressure shaft speed sensor 40 is coupled to the controller 36 as part of a closed loop control system, such as a PID controller. Power transfer between the engines 10a, 10b is then controlled on the basis of low-pressure shaft speed, such that generator 32a electrical output, and electric motor 32b power demand is controlled to maintain the low-pressure shaft speed of engine 10a at a predetermined set point, which may be a shaft speed prior to entering the power transfer mode, or may comprise a cruise thrust setting shaft speed. This speed may be maintained up to a predetermined power transfer limit. The power transfer limit may be set by one of an electric machine 32a, 32b maximum rating, or considerations of the gas turbine engine 10a, 10b operation. One such consideration may comprise minimum compressor 14a stall margin, or maximum fan 12b operating speed N1.

Similarly, in the case of the outboard gas turbine engine 10b, the increased fuel flow results in increase high and low-pressure shaft 22b, 24b speed. In particular, low-pressure shaft speed increases to a greater degree than would be provided by the increased fuel flow alone, in view of the power injection to the low-pressure shaft 24b from the electric machine 32b operating as a motor. Consequently, fan 12b speed increases, resulting in increased thrust from the outboard engine 10b.

Figure 4:
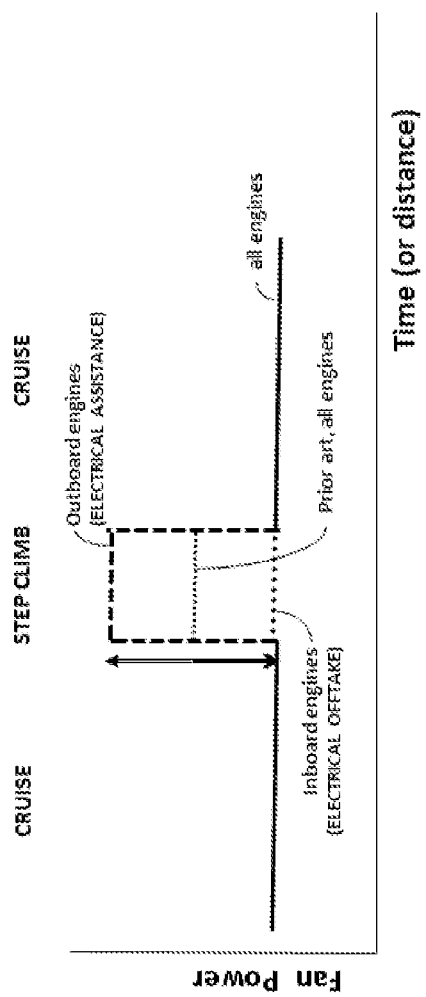
FIG. 4 is a graph showing the evolution of thrust over time for the propulsion system of FIG. 1 when operated according to the method of FIG. 3.
Figure 5:
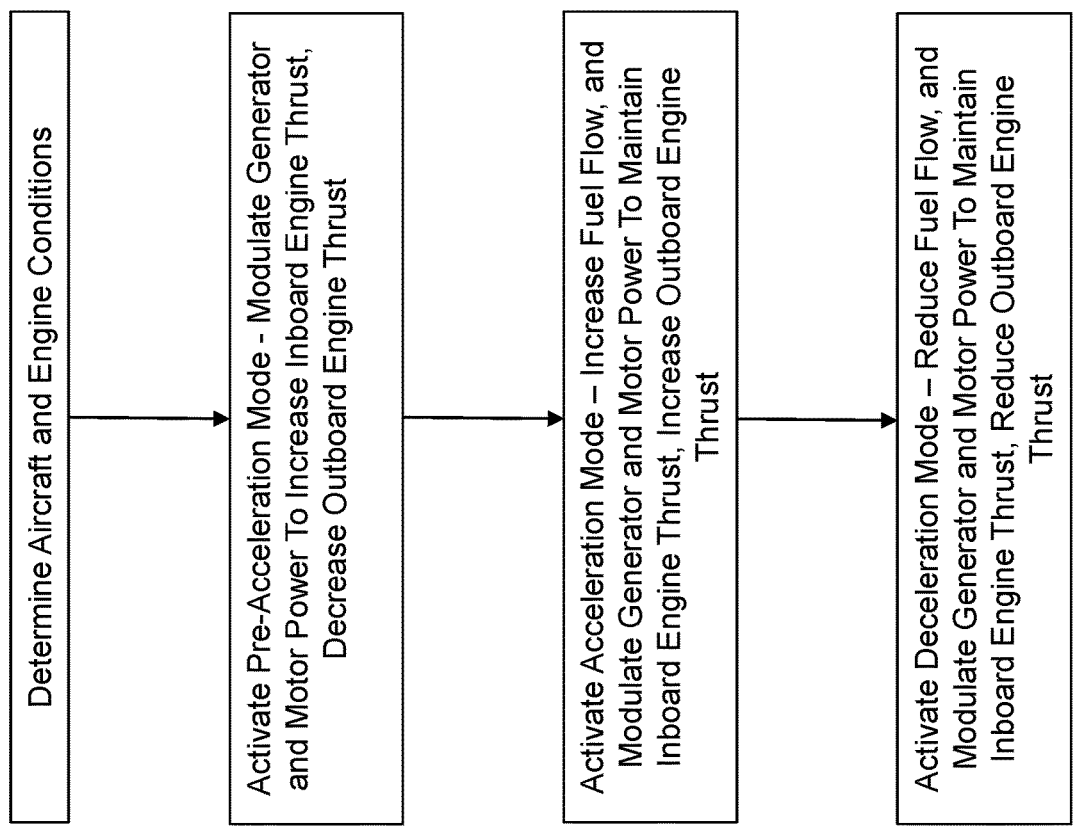
FIG. 5 is a flow diagram of a second method of operating the propulsion system of FIG. 1.

FIG. 4 illustrates the impact of this method on the overall thrust and the thrust contribution from the inboard and outboard engines. The increased thrust demand from the controller 38 results in increased thrust from the propulsion system 5 as a whole. However, the contribution to the thrust is not provided equally by all of the engines. As will be appreciated, the relatively unchanged rotational speed of the low-pressure spool of the inboard gas turbine engine 10a will result in relatively constant thrust from this engine, since the majority of thrust in high-bypass ratio gas turbine engines is generated by the fan flow, rather than core flow. The high-pressure spool may accelerate, but since core flow represents a relatively small proportion of overall thrust, the any net thrust increase will be small. Similarly, the increased rotational speed of the fan 12b of the outboard engine 10b will result in increased fan thrust, while high-pressure rotational speed and core thrust may be relatively unchanged. Consequently, overall thrust of the outboard engine 10b is increased. Since the engines are provided in pairs, the unequal contribution to the thrust does not result in thrust asymmetry.

The resultant increase in rotational speed of the low-pressure spool of the outboard engines 10b results in an increase in noise level generated by those engines, in view of the increased mass flow and bypass jet velocity produced by the fan. In modern, high-bypass gas turbine engines, a majority of the noise generated in flight is generated by the fan flow, rather than core flow, since the core flow is shielded by the fan flow and to an extent by the nacelle. However, the resultant increase in rotational speed of the outboard engines 10b, 10d relative to the inboard engines 10a, 10c results in a relatively small increase in noise perceived by the passengers onboard the aircraft 1. This is because the outboard engines are located further from the fuselage 2 (and therefore further from the passengers) than the inboard engines. Consequently, the overall noise perceived by passengers is reduced relative to conventional propulsion systems.

It will be appreciated that a similar effect could be provided by increasing the fuel flow demand to the outboard engines, and maintaining the inboard engines at a constant fuel flow setting. However, in general, fuel flow in a given engine cannot be increased beyond a certain level for the conditions, since the resultant increase in turbine entry temperature will result in damage to the turbines. In other cases, fan or core spool rotational speeds may be a limiting factor. This is particularly relevant during climb at high altitudes. By increasing fuel flow demand to both engines, and transferring power to the outboard engines, outboard engine thrust can be increased beyond the maximum for a conventional aircraft, without exceeding maximum turbine entry temperature.

The system is also operable in accordance with further methods.

Figure 6:
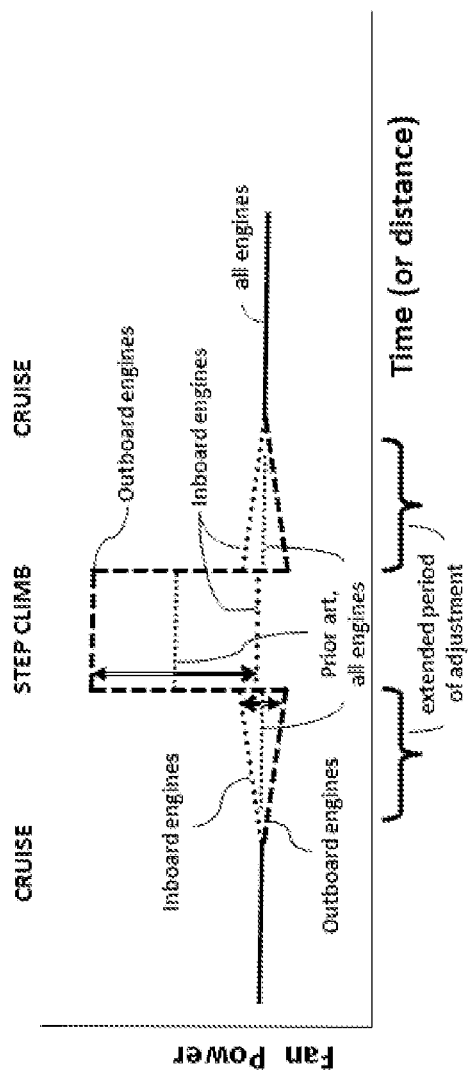
FIG. 6 is a is a graph showing the evolution of thrust over time for the propulsion system of FIG. 1 when operated according to the method of FIG. 5.

FIG. 6 illustrates a second method of operation of the propulsion system 5. In this case, power is to be transferred from the outboard engine 10b, 10d, to the inboard engines 10a, 10c. Consequently, the electric machine 32b is configured to operate as a generator, and the electric machine 32a is configured to operate as a motor.

In a first step, the aircraft determines whether aircraft and engine conditions are met to enable power transfer mode. In particular, the system may comprise a step to determine that a thrust increase is requested, but the application of increased thrust can be delayed. For example, the aircraft autopilot may indicate that a flight level change is required.

A "pre-acceleration" method of operating is then imposed. The level of power transferred between the engines is gradually increased in advance of the thrust change, while maintaining overall thrust levels. The controller 38 is configured to set a substantially constant fuel flow demand to the inboard and outboard engines 10a-d. The controller 36 controls the electric machine 32b to operate as a generator, and to operate the electric machine 32a as a motor, to thereby transfer power from the outboard engine 10b to the inboard engine 10a. Consequently, inboard engine thrust increases, while outboard engine thrust decreases, in view of the accelerating low-pressure spool on the inboard engines 10a, 10c, and decelerating low-pressure spool on the outboard engines 10b, 10d. Fuel flow may be slightly increased on some or all engines to maintain overall engine thrust, in view of inefficiencies of the power transfer system.

During the pre-acceleration method of operation, the power transfer magnitude is increased gradually on the basis of a set schedule, which in turn results in gradually increasing inboard engine thrust, and gradually decreasing outboard engine thrust, as shown in FIG. 6.

Again, the system may utilise respective low-pressure speed sensors 40a, 40b to control the rotational speed of each engine 10a, 10b. As the rotational speed set-point is increased over time, power transfer is modulated by the controller 36 to maintain the low-pressure shaft speed at the set point.

Once a thrust change is commanded to commence, the engines are operated in the acceleration mode, as outlined previously. In this mode, fuel flow to all engines 10a-d is increased. Simultaneously, the direction of power transfer is reversed, with power being transferred from the inboard engines to the outboard engines. The result is a relatively constant or only slight increase in inboard engine speed, while the outboard engines accelerate rapidly. Again, this will result in reduced noise perceived by the passengers aboard the aircraft.

Following operation in the acceleration mode, increased engine thrust is maintained for a period, while power transfer continues, to allow the aircraft to complete the necessary step climb.

Following the end of the step climb, the engines are operated in accordance with a deceleration mode, in which the engines power transfer direction is again reversed, such that the power is transferred from the outboard engines to the inboard engines. In this case, fuel is rapidly reduced to each engine, such that high-pressure spool speed falls rapidly. However, the magnitude of power transfer is gradually reduced, to slowly decelerate the inboard engines. It will be appreciated that a similar process can be operated in reverse, when decelerating the engines, such as when transitioning from top-of climb to cruise or from step-climb to cruise, or from cruise to top-of-descent.

Such a method may reduce the rapid pitch change in noise level generated by the engines when transitioning from cruise to climb, and thereby reduce perceived noise and discomfort for passengers.

The disclosed arrangement and method can also be applied to aircraft having different configurations.

Figure 7:
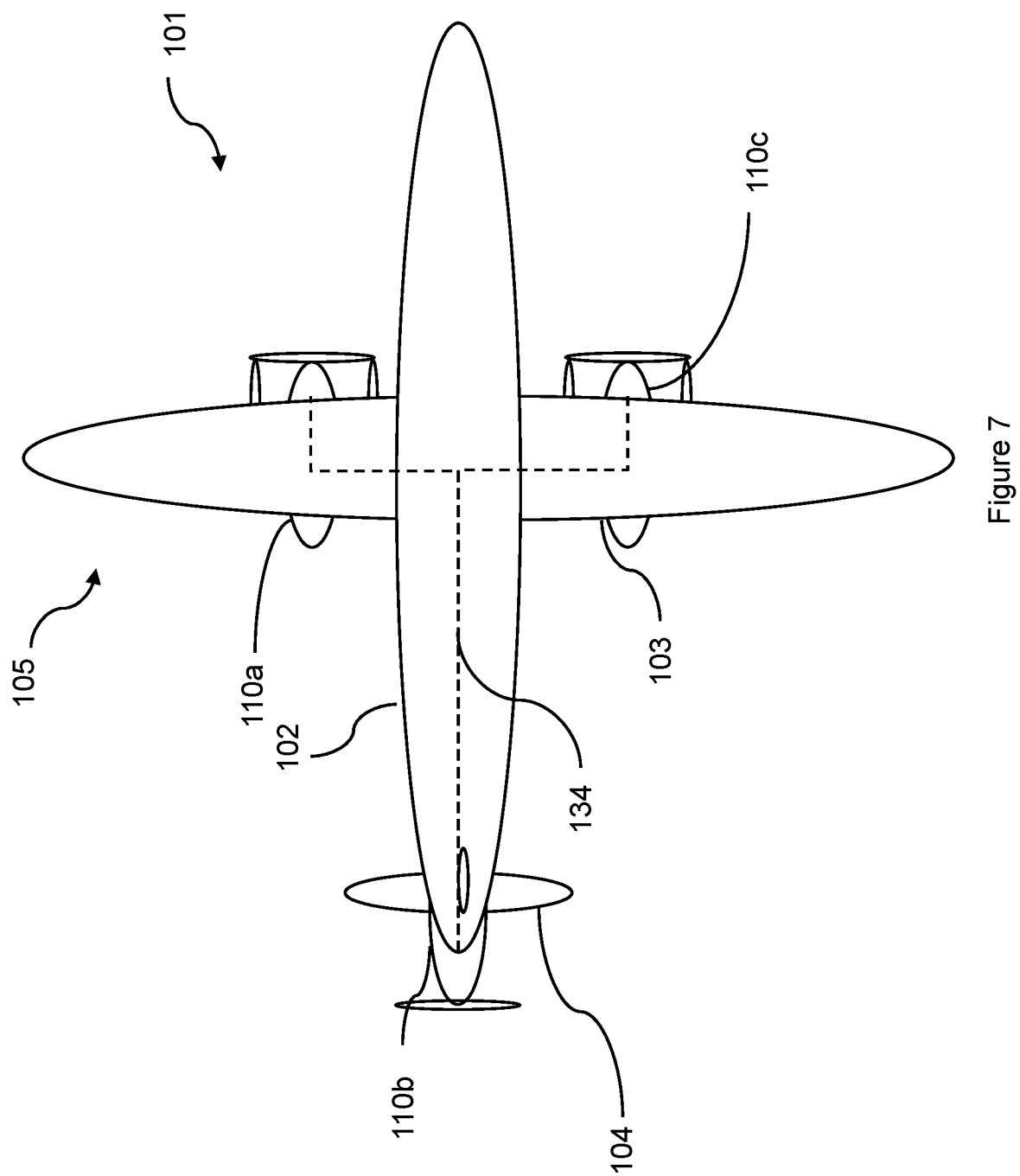
FIG. 7 is a plan view of a second aircraft comprising a parallel hybrid propulsion system.

For example, the aircraft may comprise a three-engine aircraft, such as the aircraft 101 shown in FIG. 7. The aircraft 101 is similar to the aircraft 1, comprising a fuselage 102, wings 103 and a tail 104. The aircraft comprises a propulsion system 105 which differs from the system 5 in terms of the locations of the engines.

The propulsion system comprises a pair of wing-mounted engines 110*a*, 110*c*. additionally, a third engine 110*b* is provided at a centreline of the aircraft in the tail 104. in this case, the tail mounted engine 110*b* forms the inboard engine, while the two wing-mounted engines form the outboard engines. Each engine 110*a-c* is similar to the engines 10*a-c* of the first embodiment, and each comprise respective electric machines (not shown). An electrical interconnector 134 is provided between the inboard engine 110*b* and outboard engines 110*a,c*.

As will be appreciated, the propulsion system 105 is operated in a similar manner to the propulsion system 5 as described above, with transfer of electrical power being made during thrust setting changes.

Additional advantages are provided by this arrangement. For example, since the third engine 110*b* is provided at the rear of the aircraft, further reductions in noise are provided.

It will be understood that the invention is not limited to the embodiments above-described and various modifications and improvements can be made without departing from the concepts described herein.

For example, different numbers of engines could be used, such as five or six engines. Different engine configurations could be utilised, with generators and motors being provided coupled to different shafts. The engines could be provided in different locations on the aircraft. For instance, all engines could be located at the tail, or engines could be distributed about the aircraft.

The engines could be in the form of turbofan engines, having a fan surrounded by a nacelle, or in the form of open rotor/turboprop engines, having propellers with no surrounding nacelle.

Except where mutually exclusive, any of the features may be employed separately or in combination with any other features and the disclosure extends to and includes all combinations and sub-combinations of one or more features described herein.

The invention claimed is:

1. An aircraft hybrid propulsion system comprising;
an aircraft;
an inboard gas turbine engine and an outboard gas turbine engine, each gas turbine engine comprising a propulsor and an electric machine coupled to one or more engine shaft;
an electrical interconnection between the electric machine of the inboard gas turbine engine and the electric machine of the outboard gas turbine engine; and a controller configured to transfer electrical power between the inboard gas turbine engine electrical machine and the outboard gas turbine engine electrical machine when a thrust setting change is selected,
wherein the controller is configured to transfer electrical power from the electric machine of the inboard gas turbine engine acting as a generator to the electric machine of the outboard gas turbine engine acting as a motor, and
wherein the controller is configured to transfer electric power from the electric machine of the inboard gas turbine engine to the electric machine of the outboard gas turbine engine when one or more of the following conditions are met:
the aircraft is at an altitude greater than a predetermined minimum; the current engine thrust is between a predetermined minimum and a predetermined maximum; and
an increased or reduced thrust setting is selected.

2. The aircraft hybrid propulsion system according to claim 1, wherein the aircraft propulsion system comprises a port inboard gas turbine engine, a starboard inboard gas turbine engine, a port outboard gas turbine engine and a starboard outboard gas turbine engine.

3. The aircraft hybrid propulsion system according to claim 1, wherein the inboard gas turbine engine is mounted substantially at a centreline of the aircraft.

4. The aircraft hybrid propulsion system according to claim 1, wherein at least one of the electric machines is operable as an electric motor and is coupled to the propulsor.

5. The aircraft hybrid propulsion system according to claim 1, wherein one or more of the gas turbine engine comprises a high-pressure spool and a low-pressure spool, wherein the propulsor forms part of the low-pressure spool.

6. The aircraft hybrid propulsion system according to claim 1, wherein the controller is configured to maintain a current overall propulsion system thrust for a predetermined period of time in advance of the changed thrust setting being selected.

7. The aircraft hybrid propulsion system according to claim 1, wherein the controller is configured to transfer electrical power from the electric machine of the outboard gas turbine engine acting as a generator to the electric machine of the inboard gas turbine engine acting as a motor.

8. A method of operating an aircraft hybrid propulsion system, the aircraft hybrid propulsion system comprising:
an aircraft;
an inboard gas turbine engine and an outboard gas turbine engine, each comprising a propulsor and a respective electric machine coupled to one or more engine shaft; and
an electrical interconnection between the electric machine of the inboard gas turbine engine and the electric machine of the outboard gas turbine engine; wherein the method comprises:
transferring electrical power between the inboard gas turbine engine electrical machine and the outboard gas turbine engine electrical machine when a thrust setting change is selected,
wherein the transfer of electrical power is from the electric machine of the inboard gas turbine engine acting as a generator to the electric machine of the outboard gas turbine engine acting as a motor, and
wherein the transfer of electric power is from the electric machine of the inboard gas turbine engine to the electric machine of the outboard gas turbine engine when one or more of the following conditions are met:

the aircraft is at an altitude greater than a predetermined minimum; the current engine thrust is between a predetermined minimum and a predetermined maximum; and an increased or reduced thrust setting is selected.

9. A controller configured to carry out the method of claim 8.

\* \* \* \* \*